(12) United States Patent
Kano et al.

(10) Patent No.: US 9,656,566 B2
(45) Date of Patent: May 23, 2017

(54) CHARGE MANAGEMENT APPARATUS

(71) Applicants: KABUSHIKI KAISHA TOSHIBA, Minato-ku (JP); TOSHIBA SOLUTIONS CORPORATION, Kawasaki-shi (JP)

(72) Inventors: Makoto Kano, Hachioji (JP); Hiroyuki Suzuki, Hino (JP); Junichi Yamamoto, Fuchu (JP); Tsuyoshi Shimada, Mitaka (JP); Kiyoshi Matsui, Yokohama (JP); Junichi Nakamura, Kawasaki (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 37 days.

(21) Appl. No.: 14/722,211

(22) Filed: May 27, 2015

(65) Prior Publication Data
US 2015/0251553 A1 Sep. 10, 2015

Related U.S. Application Data

(63) Continuation of application No. PCT/JP2013/082035, filed on Nov. 28, 2013.

(30) Foreign Application Priority Data

Nov. 30, 2012 (JP) .................. 2012-263385

(51) Int. Cl.
*B60L 11/18* (2006.01)
*G06Q 10/10* (2012.01)
(Continued)

(52) U.S. Cl.
CPC ....... *B60L 11/1838* (2013.01); *B60L 11/1816* (2013.01); *B60L 11/1861* (2013.01);
(Continued)

(58) Field of Classification Search
CPC .............. B60L 11/1838; B60L 11/1816; B60L 11/1861; B60L 11/1862; B60L 2240/12;
(Continued)

(56) References Cited

U.S. PATENT DOCUMENTS

| 2010/0106401 A1 | 4/2010 | Naito et al. |
| 2011/0238257 A1 | 9/2011 | Tarnowsky et al. |

(Continued)

FOREIGN PATENT DOCUMENTS

| CN | 102103799 A | 6/2011 |
| CN | 102201133 A | 9/2011 |

(Continued)

OTHER PUBLICATIONS

Combined Chinese Office Action and Search Report issued on Apr. 27, 2016 in Patent Application No. 201380062408.5 (with English language translation).

(Continued)

*Primary Examiner* — Abby Lin
(74) *Attorney, Agent, or Firm* — Oblon, McClelland, Maier & Neustadt, L.L.P.

(57) ABSTRACT

According to one embodiment, a charge management apparatus includes an input unit, a first estimation unit, a determination unit, a generation unit, and an output unit. The input unit accepts an input of traffic demand data indicative of a number of vehicles. The first estimation unit estimates charge wait times at plural charge stations based on the traffic demand data. The determination unit compares the estimated charge wait times at the respective charge stations, and determines whether a desired condition is satisfied. The generation unit generates charge recommendation information indicative of a charge station according to a determination result. The output unit outputs the charge recommendation information to an external terminal.

4 Claims, 18 Drawing Sheets

(51) Int. Cl.
*G08G 1/065* (2006.01)
*G08G 1/01* (2006.01)
*G08G 1/0967* (2006.01)
*H02J 7/00* (2006.01)

(52) U.S. Cl.
CPC .......... *B60L 11/1862* (2013.01); *G06Q 10/10* (2013.01); *G08G 1/0112* (2013.01); *G08G 1/0129* (2013.01); *G08G 1/0141* (2013.01); *G08G 1/065* (2013.01); *G08G 1/096716* (2013.01); *G08G 1/096741* (2013.01); *G08G 1/096775* (2013.01); *B60L 2240/12* (2013.01); *B60L 2240/622* (2013.01); *B60L 2240/68* (2013.01); *B60L 2240/72* (2013.01); *B60L 2240/80* (2013.01); *B60L 2250/16* (2013.01); *B60L 2260/44* (2013.01); *B60L 2260/50* (2013.01); *B60L 2260/58* (2013.01); *H02J 7/00* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/14* (2013.01); *Y02T 90/16* (2013.01); *Y02T 90/162* (2013.01); *Y02T 90/163* (2013.01)

(58) Field of Classification Search
CPC .......... B60L 2240/622; B60L 2240/68; B60L 2240/72; B60L 2240/80; B60L 2250/16; B60L 2260/44; B60L 2260/50; B60L 2260/58; G06Q 10/10; G08G 1/0112; G08G 1/0129; G08G 1/0141; G08G 1/065; G08G 1/096716; G08G 1/096741; G08G 1/096775; H02J 7/00; G06F 17/50; G06F 17/5009; Y02T 10/7005; Y02T 10/7044; Y02T 10/705; Y02T 10/7072; Y02T 10/7291; Y02T 90/14; Y02T 90/16; Y02T 90/162; Y02T 90/163
See application file for complete search history.

(56) References Cited

U.S. PATENT DOCUMENTS

| | | |
|---|---|---|
| 2012/0098676 A1 | 4/2012 | Oizumi et al. |
| 2012/0245750 A1 | 9/2012 | Paul et al. |
| 2012/0268061 A1 | 10/2012 | Bhageria et al. |
| 2012/0306446 A1 | 12/2012 | Suganuma et al. |
| 2013/0035804 A1* | 2/2013 | Nakazawa ......... G01C 21/3469 701/1 |
| 2013/0282265 A1 | 10/2013 | Arita et al. |
| 2013/0317790 A1* | 11/2013 | Fukubayashi ............. B60L 3/12 703/1 |

FOREIGN PATENT DOCUMENTS

| | | |
|---|---|---|
| CN | 102473351 A | 5/2012 |
| JP | 2011-013893 A | 1/2011 |
| JP | 2011-164050 A | 8/2011 |
| JP | 2011-191109 A | 9/2011 |
| JP | 2011-214930 A | 10/2011 |
| JP | 2011-238182 A | 11/2011 |
| JP | 2012-003391 A | 1/2012 |
| JP | 2012-048286 A | 3/2012 |
| WO | WO 2011/102515 A1 | 8/2011 |
| WO | WO 2011/132583 A1 | 10/2011 |
| WO | WO 2012/105544 A1 | 8/2012 |
| WO | WO 2012/114381 A1 | 8/2012 |

OTHER PUBLICATIONS

Extended European Search Report issued on May 30, 2016 in European Patent Application No. 13858263.0.
Office Action issued Jun. 2, 2015 in Japanese Patent Application No. 2012-263385 (with English language translation).
International Search Report issued Dec. 24, 2013 for PCT/JP2013/082035 filed on Nov. 28, 2013 with English Translation.

* cited by examiner

FIG. 2

| Link name | Downstream link name | Link length (m) | Average electricity efficiency (km/kWh) | Average speed (m/s) |
|---|---|---|---|---|
| LK1 | LK2 | 6100 | 9 | 16.7 |
| LK2 | LK3 | 4700 | 9 | 16.7 |
| LK3 | LK4 | 8300 | 9 | 16.7 |
| LK4 | LK5 | 11200 | 8 | 16.7 |
| LK5 | LK6 | 4300 | 6 | 16.7 |
| LK6 | LK7 | 4100 | 8 | 16.7 |
| LK7 | LK8 | 7900 | 9 | 16.7 |
| LK8 | LK9 | 8100 | 9 | 16.7 |
| LK9 | LK10 | 14400 | 9 | 16.7 |
| LK10 | LK11 | 4900 | 9 | 16.7 |
| LK11 | LK12 | 8000 | 9 | 16.7 |
| LK12 | LK13 | 11800 | 9 | 16.7 |
| LK13 | LK14 | 11500 | 9 | 16.7 |
| LK14 | LK15 | 12200 | 9 | 16.7 |
| LK15 | LK16 | 6800 | 9 | 16.7 |
| LK16 | LK17 | 10900 | 9 | 16.7 |
| LK17 | LK18 | 7200 | 9 | 16.7 |
| LK18 | LK19 | 12100 | 9 | 16.7 |
| LK19 | LK20 | 12600 | 9 | 16.7 |
| LK20 | LK21 | 4100 | 9 | 16.7 |
| LK21 | LK22 | 4300 | 9 | 16.7 |
| LK22 | LK23 | 12800 | 9 | 16.7 |
| LK23 | LK24 | 13800 | 9 | 16.7 |
| LK24 | — | 16400 | 9 | 16.7 |

F I G. 4

D4

| Charge station name | Existing link name | Distance from starting point (m) | Number of chargers | Charge speed (kWh/s) |
|---|---|---|---|---|
| CS1 | LK3 | 4700 | 8 | 0.009 |
| CS2 | LK6 | 1500 | 8 | 0.009 |
| CS3 | LK8 | 3800 | 10 | 0.009 |
| CS4 | LK9 | 8500 | 8 | 0.009 |
| CS5 | LK10 | 3700 | 10 | 0.009 |
| CS6 | LK12 | 3600 | 8 | 0.009 |
| CS7 | LK13 | 7900 | 10 | 0.009 |
| CS8 | LK14 | 12200 | 8 | 0.009 |
| CS9 | LK17 | 1400 | 10 | 0.009 |
| CS10 | LK18 | 7900 | 8 | 0.009 |
| CS11 | LK20 | 2300 | 5 | 0.009 |
| CS12 | LK22 | 9500 | 5 | 0.009 |

| ITS spot name/ electronic bulletin board name | Existing link name | Distance from starting point | Associated charge station name |
|---|---|---|---|
| SP1 | LK3 | 1000 | CS1, CS2 |
| SP2 | LK7 | 3000 | CS3, CS4, CS5 |
| SP3 | LK11 | 4000 | CS6, CS7, CS8 |
| DB1 | LK15 | 4000 | CS9, CS10 |
| DB2 | LK19 | 8000 | CS11, CS12 |

FIG. 6

```
           Charge recommendation information
Charge wait time of [CS2] is [    2] minute(s).

Charge wait time of [CS3] is [   30] minute(s).
```

| | CS1 passage time instant | | | | |
|---|---|---|---|---|---|
| Charge station name | 8:00 | 8:10 | 8:20 | 8:30 | ... |
| CS1 | 0 | 0 | 100 | 300 | ... |
| CS2 | 0 | 100 | 300 | 900 | ... |
| CS3 | 500 | 1800 | 2000 | 2000 | ... |
| CS4 | 0 | 900 | 1000 | 1100 | ... |
| CS5 | 0 | 400 | 800 | 1000 | ... |
| CS6 | 100 | 400 | 700 | 1000 | ... |
| CS7 | 200 | 800 | 900 | 1200 | ... |
| CS8 | 800 | 1600 | 2400 | 2500 | ... |
| CS9 | 400 | 800 | 1200 | 1600 | ... |
| CS10 | 200 | 400 | 600 | 800 | ... |
| CS11 | 0 | 100 | 400 | 600 | ... |
| CS12 | 0 | 0 | 300 | 500 | ... |

| Charge station name | | CS1 passage time instant | | | | |
|---|---|---|---|---|---|---|
| Upstream side | Downstream side | 8:00 | 8:10 | 8:20 | 8:30 | ... |
| CS1 | CS2 | OK | OK | OK | OK | ... |
| CS2 | CS3 | OK | NG | NG | OK | ... |
| CS3 | CS4 | OK | OK | OK | OK | ... |
| CS4 | CS5 | OK | OK | OK | OK | ... |
| CS5 | CS6 | OK | OK | OK | OK | ... |
| CS6 | CS7 | OK | OK | OK | OK | ... |
| CS7 | CS8 | OK | OK | NG | NG | ... |
| CS8 | CS9 | OK | OK | OK | OK | ... |
| CS9 | CS10 | OK | OK | OK | OK | ... |
| CS10 | CS11 | OK | OK | OK | OK | ... |
| CS11 | CS12 | OK | OK | OK | OK | ... |

| ITS spot name/ electronic bulletin board name | Presentation start time instant | Presentation end time instant | Upstream CS | Wait time (sec) | Downstream CS | Wait time (sec) |
|---|---|---|---|---|---|---|
| SP1 | 7:50 | 8:00 | CS2 | 100 | CS3 | 1800 |
| SP1 | 8:00 | 8:10 | CS2 | 300 | CS3 | 2000 |
| SP3 | 8:50 | 9:00 | CS7 | 900 | CS8 | 2400 |
| SP3 | 9:00 | 9:10 | CS7 | 1200 | CS8 | 2500 |

FIG. 12

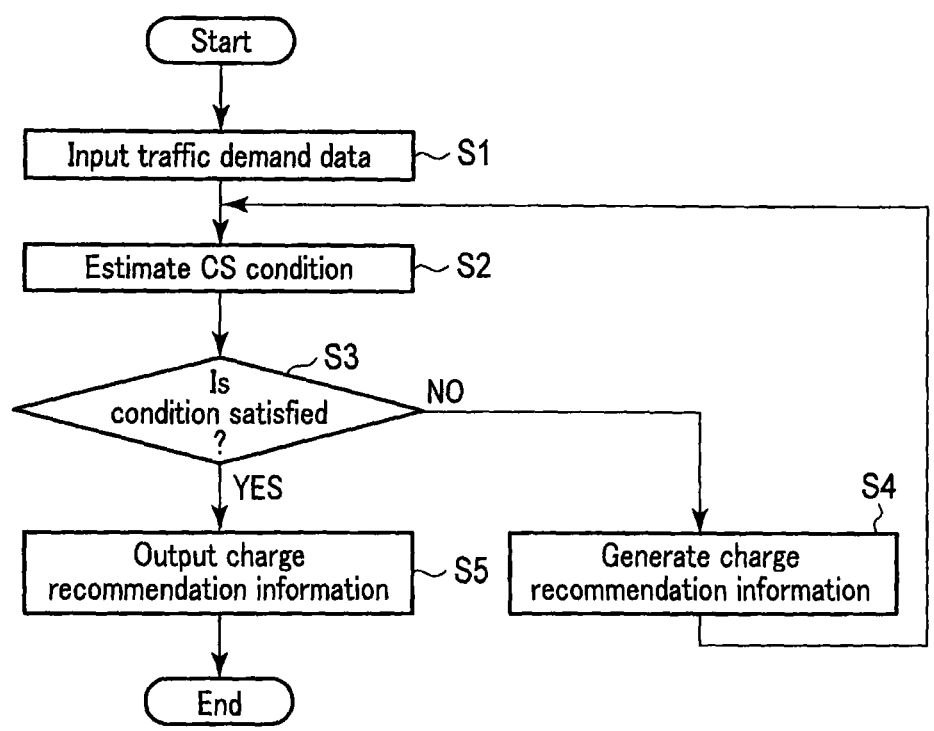
F I G. 13

FIG. 18

| Time (sec) | Charge station name ||||||||||||
| | CS1 | CS2 | CS3 | CS4 | CS5 | CS6 | CS7 | CS8 | CS9 | CS10 | CS11 | CS12 |
|---|---|---|---|---|---|---|---|---|---|---|---|---|
| 0:00 ~ 1:00 | 250 | 250 | 350 | 250 | 350 | 250 | 350 | 250 | 350 | 250 | 150 | 150 |
| 1:00 ~ 2:00 | 250 | 250 | 350 | 250 | 350 | 250 | 350 | 250 | 350 | 250 | 150 | 150 |
| 2:00 ~ 3:00 | 250 | 250 | 350 | 250 | 350 | 250 | 350 | 250 | 350 | 250 | 150 | 150 |
| 3:00 ~ 4:00 | 250 | 250 | 350 | 250 | 350 | 250 | 350 | 250 | 350 | 250 | 150 | 150 |
| 4:00 ~ 5:00 | 250 | 250 | 400 | 250 | 350 | 250 | 350 | 250 | 350 | 250 | 150 | 150 |
| 5:00 ~ 6:00 | 250 | 250 | 400 | 250 | 350 | 250 | 400 | 300 | 380 | 250 | 150 | 150 |
| 6:00 ~ 7:00 | 250 | 300 | 400 | 300 | 350 | 300 | 400 | 300 | 380 | 300 | 150 | 150 |
| 7:00 ~ 8:00 | 300 | 300 | 400 | 300 | 350 | 300 | 400 | 300 | 380 | 300 | 150 | 150 |
| 8:00 ~ 9:00 | 300 | 300 | 400 | 300 | 350 | 300 | 400 | 300 | 400 | 300 | 150 | 150 |
| 9:00 ~ 10:00 | 300 | 300 | 420 | 350 | 400 | 350 | 400 | 350 | 420 | 350 | 150 | 150 |
| 10:00 ~ 11:00 | 350 | 350 | 420 | 350 | 400 | 350 | 400 | 350 | 420 | 350 | 200 | 200 |
| 11:00 ~ 12:00 | 350 | 350 | 420 | 350 | 400 | 350 | 400 | 350 | 420 | 300 | 200 | 200 |
| 12:00 ~ 13:00 | 350 | 350 | 400 | 300 | 400 | 300 | 400 | 300 | 400 | 300 | 200 | 200 |
| 13:00 ~ 14:00 | 300 | 300 | 400 | 300 | 400 | 300 | 400 | 300 | 400 | 300 | 200 | 200 |
| 14:00 ~ 15:00 | 300 | 300 | 400 | 300 | 400 | 300 | 400 | 300 | 400 | 300 | 200 | 200 |
| 15:00 ~ 16:00 | 300 | 300 | 350 | 300 | 400 | 300 | 400 | 300 | 380 | 300 | 150 | 150 |
| 16:00 ~ 17:00 | 300 | 300 | 350 | 250 | 350 | 250 | 400 | 250 | 380 | 300 | 150 | 200 |
| 17:00 ~ 18:00 | 300 | 300 | 350 | 250 | 350 | 250 | 350 | 250 | 380 | 250 | 150 | 150 |
| 18:00 ~ 19:00 | 250 | 250 | 350 | 250 | 350 | 250 | 350 | 250 | 350 | 250 | 150 | 150 |
| 19:00 ~ 20:00 | 250 | 250 | 350 | 250 | 350 | 250 | 350 | 250 | 350 | 250 | 150 | 150 |
| 20:00 ~ 21:00 | 250 | 250 | 350 | 250 | 350 | 250 | 350 | 250 | 350 | 250 | 150 | 150 |
| 21:00 ~ 22:00 | 250 | 250 | 350 | 250 | 350 | 250 | 350 | 250 | 350 | 250 | 150 | 150 |
| 22:00 ~ 23:00 | 250 | 250 | 350 | 250 | 350 | 250 | 350 | 250 | 350 | 250 | 150 | 150 |
| 23:00 ~ 0:00 | 250 | 250 | 350 | 250 | 350 | 250 | 350 | 250 | 350 | 250 | 150 | 150 |

D10

| Time (sec) | Charge station name | | | | | | | | | | | |
|---|---|---|---|---|---|---|---|---|---|---|---|---|
| | CS1 | CS2 | CS3 | CS4 | CS5 | CS6 | CS7 | CS8 | CS9 | CS10 | CS11 | CS12 |
| 0:00 ~ 1:00 | 6 | 6 | 8 | 6 | 8 | 6 | 8 | 6 | 8 | 6 | 3 | 3 |
| 1:00 ~ 2:00 | 6 | 6 | 8 | 6 | 8 | 6 | 8 | 6 | 8 | 6 | 3 | 3 |
| 2:00 ~ 3:00 | 6 | 6 | 8 | 6 | 8 | 6 | 8 | 6 | 8 | 6 | 3 | 3 |
| 3:00 ~ 4:00 | 6 | 6 | 8 | 6 | 8 | 6 | 8 | 6 | 8 | 6 | 3 | 3 |
| 4:00 ~ 5:00 | 6 | 6 | 8 | 6 | 8 | 6 | 8 | 6 | 8 | 6 | 3 | 3 |
| 5:00 ~ 6:00 | 6 | 6 | 10 | 6 | 8 | 6 | 10 | 6 | 9 | 6 | 3 | 3 |
| 6:00 ~ 7:00 | 6 | 6 | 10 | 7 | 8 | 7 | 10 | 7 | 9 | 6 | 3 | 3 |
| 7:00 ~ 8:00 | 7 | 7 | 10 | 7 | 8 | 7 | 10 | 7 | 9 | 7 | 3 | 3 |
| 8:00 ~ 9:00 | 7 | 7 | 10 | 7 | 8 | 7 | 10 | 7 | 9 | 7 | 3 | 3 |
| 9:00 ~ 10:00 | 7 | 7 | 10 | 7 | 10 | 7 | 10 | 7 | 10 | 7 | 3 | 3 |
| 10:00 ~ 11:00 | 7 | 7 | 10 | 7 | 10 | 7 | 10 | 8 | 10 | 7 | 3 | 3 |
| 11:00 ~ 12:00 | 8 | 8 | 10 | 8 | 10 | 8 | 10 | 8 | 10 | 8 | 3 | 3 |
| 12:00 ~ 13:00 | 8 | 8 | 10 | 8 | 10 | 8 | 10 | 8 | 10 | 8 | 5 | 5 |
| 13:00 ~ 14:00 | 8 | 8 | 10 | 7 | 10 | 7 | 10 | 7 | 10 | 8 | 5 | 5 |
| 14:00 ~ 15:00 | 7 | 7 | 10 | 7 | 10 | 7 | 10 | 7 | 10 | 7 | 5 | 5 |
| 15:00 ~ 16:00 | 7 | 7 | 10 | 7 | 10 | 7 | 10 | 7 | 10 | 7 | 5 | 5 |
| 16:00 ~ 17:00 | 7 | 7 | 10 | 7 | 10 | 7 | 10 | 7 | 10 | 7 | 5 | 5 |
| 17:00 ~ 18:00 | 7 | 7 | 8 | 6 | 8 | 6 | 8 | 6 | 9 | 7 | 3 | 3 |
| 18:00 ~ 19:00 | 6 | 6 | 8 | 6 | 8 | 6 | 8 | 6 | 9 | 6 | 3 | 3 |
| 19:00 ~ 20:00 | 6 | 6 | 8 | 6 | 8 | 6 | 8 | 6 | 9 | 6 | 3 | 3 |
| 20:00 ~ 21:00 | 6 | 6 | 8 | 6 | 8 | 6 | 8 | 6 | 8 | 6 | 3 | 3 |
| 21:00 ~ 22:00 | 6 | 6 | 8 | 6 | 8 | 6 | 8 | 6 | 8 | 6 | 3 | 3 |
| 22:00 ~ 23:00 | 6 | 6 | 8 | 6 | 8 | 6 | 8 | 6 | 8 | 6 | 3 | 3 |
| 23:00 ~ 0:00 | 6 | 6 | 8 | 6 | 8 | 6 | 8 | 6 | 8 | 6 | 3 | 3 |

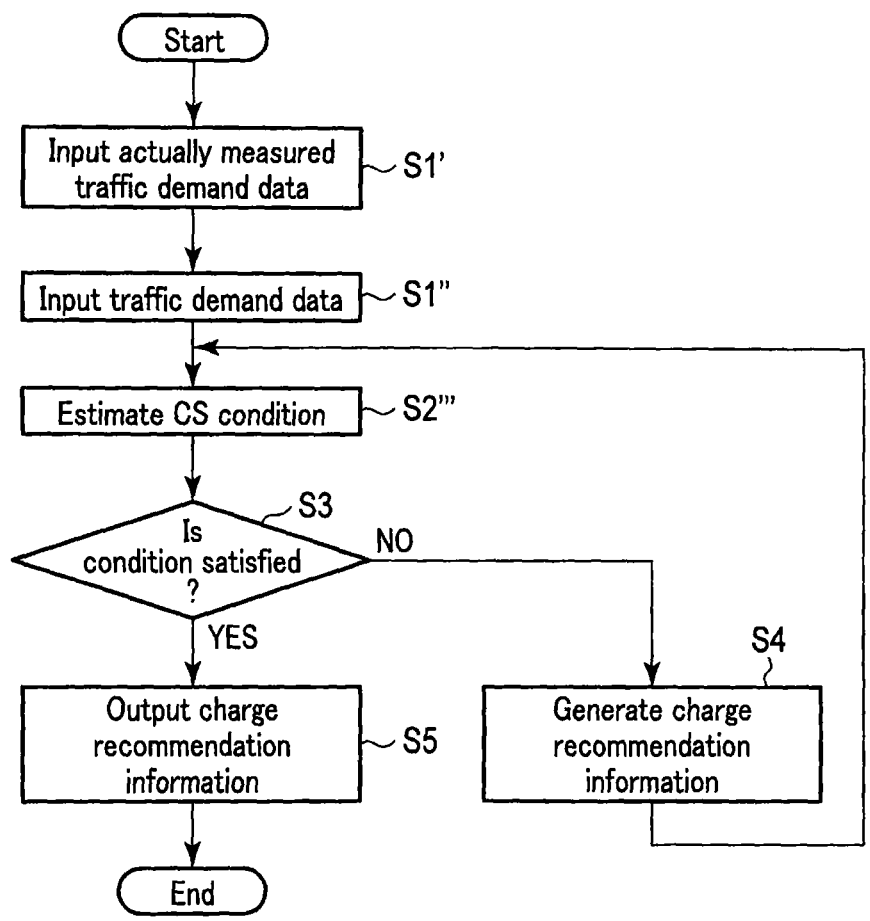
F I G. 22

CHARGE MANAGEMENT APPARATUS

CROSS REFERENCE TO RELATED APPLICATIONS

This application is a Continuation Application of PCT Application No. PCT/JP2013/082035, filed Nov. 28, 2013, and is based upon and claiming the benefit of priority from Japanese Patent Application No. 2012-263385, filed Nov. 30, 2012, the entire contents of which are incorporated herein by reference.

FIELD

Embodiments of the present invention relate to a charge management apparatus.

BACKGROUND

At present, since the diffusion rate of electric cars is lower than the diffusion rate of gasoline-powered cars, it rarely happens that charge stations (CS: Charge Station), which are facilities for charging electric cars, are crowded.

However, in the future, if electric cars will gain in popularity, the congestion at charge stations will pose a serious problem, like traffic congestion.

Thus, in order to avoid congestion occurring when electric cars come to some charge stations, it is necessary to inform drivers of charge recommendation information which indicates which charge station can provide smooth charging, thereby leveling the congestion at charge stations.

As a technique for informing drivers of charge recommendation information, for example, there is known a technique wherein the current positions and residual battery capacities of all electric cars are measured, and then charge recommendation information is generated based on the measured results, and the drivers are informed of the generated charge recommendation information.

However, in the above-described technique, it is necessary to measure the current positions and residual battery capacities of all electric cars running, for example, on a toll road or the like, and there is such a problem that this is difficult to realize at present.

BRIEF DESCRIPTION OF THE DRAWINGS

FIG. 2 is a schematic view illustrating an example of traffic demand data.

FIG. 4 is a schematic view illustrating an example of link information.

FIG. 5 is a schematic view illustrating an example of CS information.

FIG. 6 is a schematic view illustrating an example of ITS spot/electronic bulletin board information.

FIG. 9 is a schematic view illustrating an example of a notification of charge recommendation information.

FIG. 10 is a schematic view illustrating an example of estimation result information.

FIG. 11 is a schematic view illustrating an example of determination result information.

FIG. 12 is a schematic view illustrating an example of charge recommendation information.

FIG. 13 is a flowchart illustrating an operation example of the charge management apparatus according to the first embodiment.

FIG. 18 is a schematic view illustrating an example of planned power supply amount information.

FIG. 19 is a schematic view illustrating an example of number-of-available chargers information.

FIG. 22 is a flowchart illustrating an operation example of the charge management apparatus according to the third embodiment.

DETAILED DESCRIPTION

In general, according to one embodiment, a charge management apparatus includes input unit, first estimation unit, determination unit, generation unit, second estimation unit, and output unit.

The input unit accepts an input of traffic demand data indicative of a number of vehicles entering/exiting a plurality of interchanges of a toll road.

The first estimation unit executes simulation by using the traffic demand data the input of which was accepted, and estimates charge wait times at a plurality of charge stations provided midway along the toll road.

The determination unit compares the estimated charge wait times at the respective charge stations, and determines whether a desired condition is satisfied.

The generation unit generates charge recommendation information indicative of a charge station capable of smooth charging, if a result of determination by the determination unit indicates that the desired condition is not satisfied.

The second estimation unit executes simulation by using the generated charge recommendation information in addition to the traffic demand data the input of which was accepted, and estimates once again the charge wait times at the respective charge stations.

The output unit outputs the generated charge recommendation information to an external terminal if a result of determination by the determination unit indicates that the desired condition is satisfied, as a result of repeatedly executing processes by the determination unit, the generation unit and the second estimation unit.

First Embodiment

Figure 1:
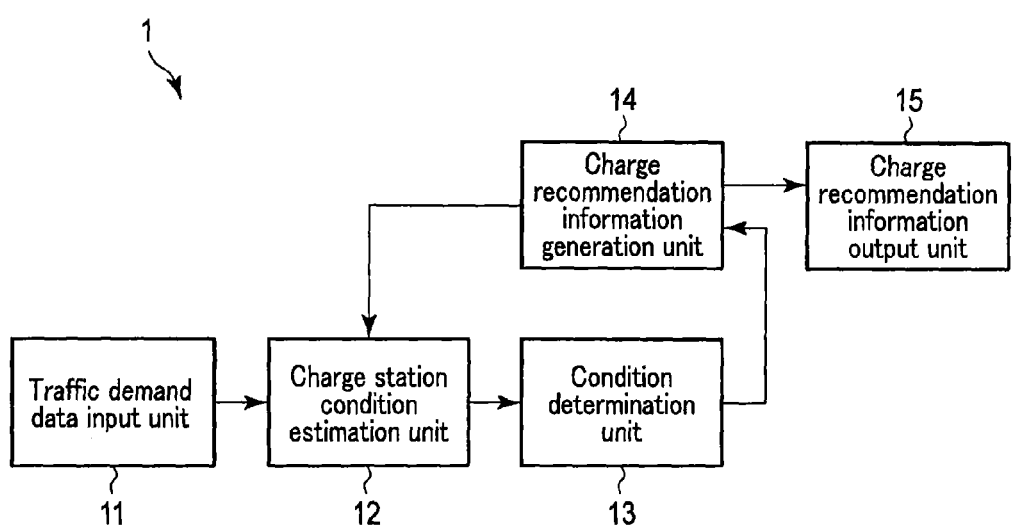
FIG. 1 is a schematic view illustrating a configuration example of a charge management apparatus according to a first embodiment.
Figure 7:
FIG. 7 is a schematic view illustrating an example of vehicle attribute information.
Figure 8:
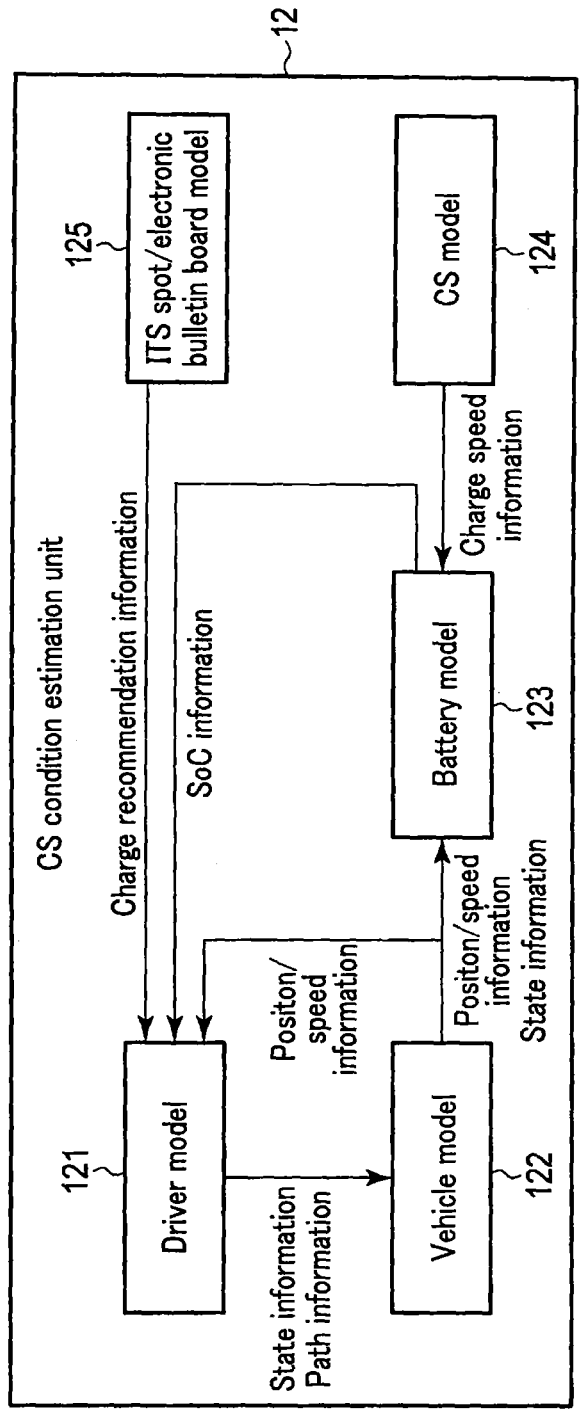
FIG. 8 is a schematic view illustrating an example of a simulation model which is used by a charge station condition estimation unit according to the first embodiment.

FIG. 1 is a schematic view illustrating a configuration example of a charge management apparatus according to a first embodiment. FIG. 2 to FIG. 7, and FIG. 9 to FIG. 12 are schematic views illustrating examples of various pieces of information, which are used by the charge management apparatus according to this embodiment. FIG. 8 is a schematic view illustrating an example of a simulation model which is used by the charge management apparatus according to this embodiment. A charge management apparatus 1 illustrated in FIG. 1 includes a traffic demand data input unit 11, a charge station condition estimation unit (hereinafter referred to as "CS condition estimation unit") 12, a condition determination unit 13, a charge recommendation information generation unit 14, and a charge recommendation information output unit 15. Hereinafter, the functions of the respective components 11 to 15, which constitute the charge management apparatus 1, will be described in detail.

Upon accepting an input of traffic demand data and SoC (State of Charge) distribution data, which are transmitted from an external terminal (not shown), the traffic demand data input unit 11 transmits to the CS condition estimation unit 12 the traffic demand data and SoC distribution data, the input of which was accepted.

Figure 2:
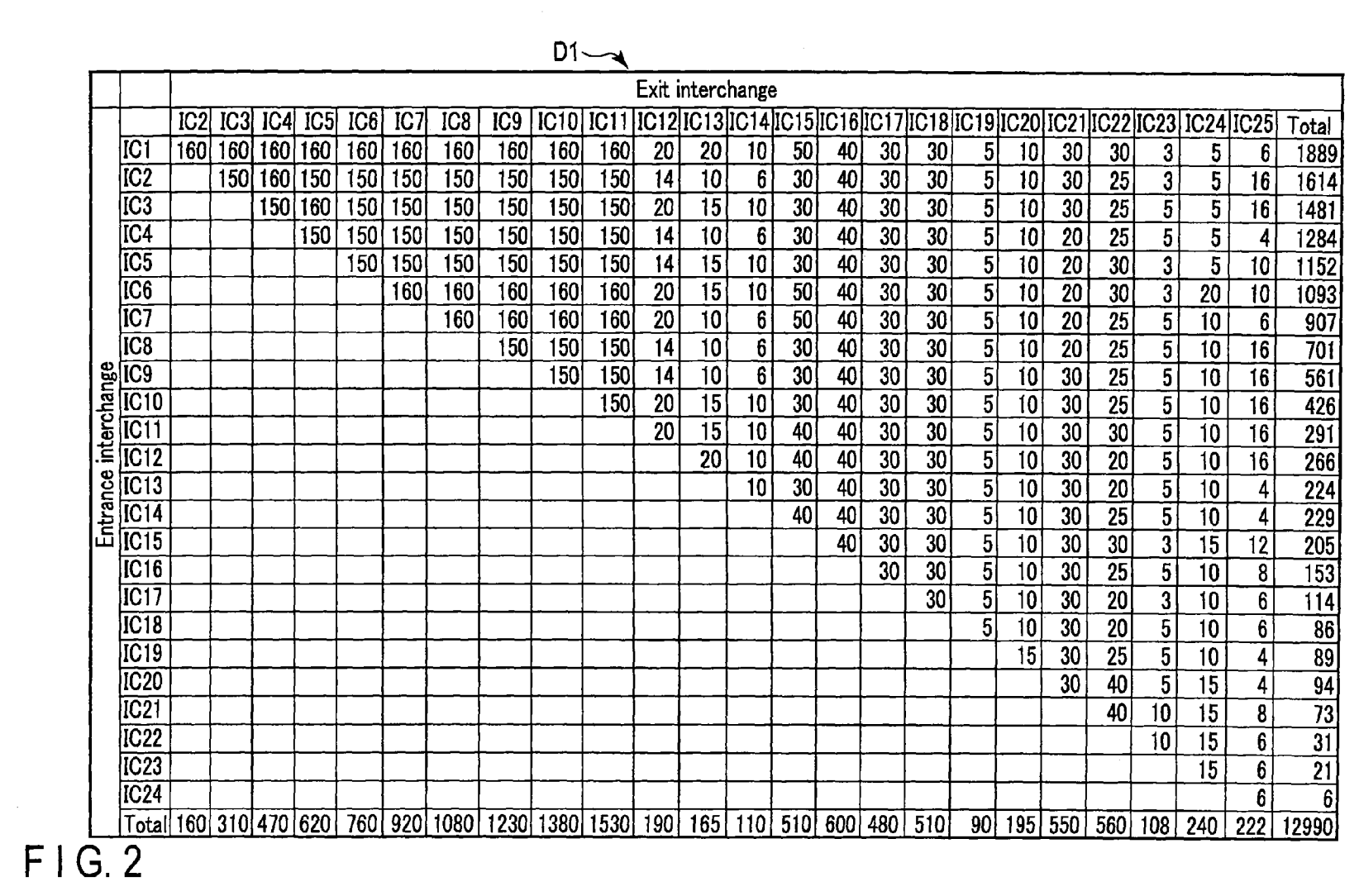

For example, as illustrated in FIG. 2, traffic demand data D1 is data indicative of numbers of vehicles exiting/entering a plurality of interchanges (hereinafter referred to as "ICs") provided on a toll road such as a highway. In FIG. 2, an example of the traffic demand data D1, which is indicative of the numbers of exiting/entering vehicles for 24 hours at respective ICs of a certain highway, is illustrated as an OD (Origin-Destination) table. However, the format of traffic demand data is not limited to this example, and an arbitrary format may be adopted if the number of exiting/entering vehicles per unit time at an arbitrary location is indicated. Incidentally, the number of vehicles indicated by the traffic demand data D1 is the sum of the numbers of electric cars and the number of other kinds of cars (e.g. gasoline-powered cars and hybrid cars).

Figure 3:
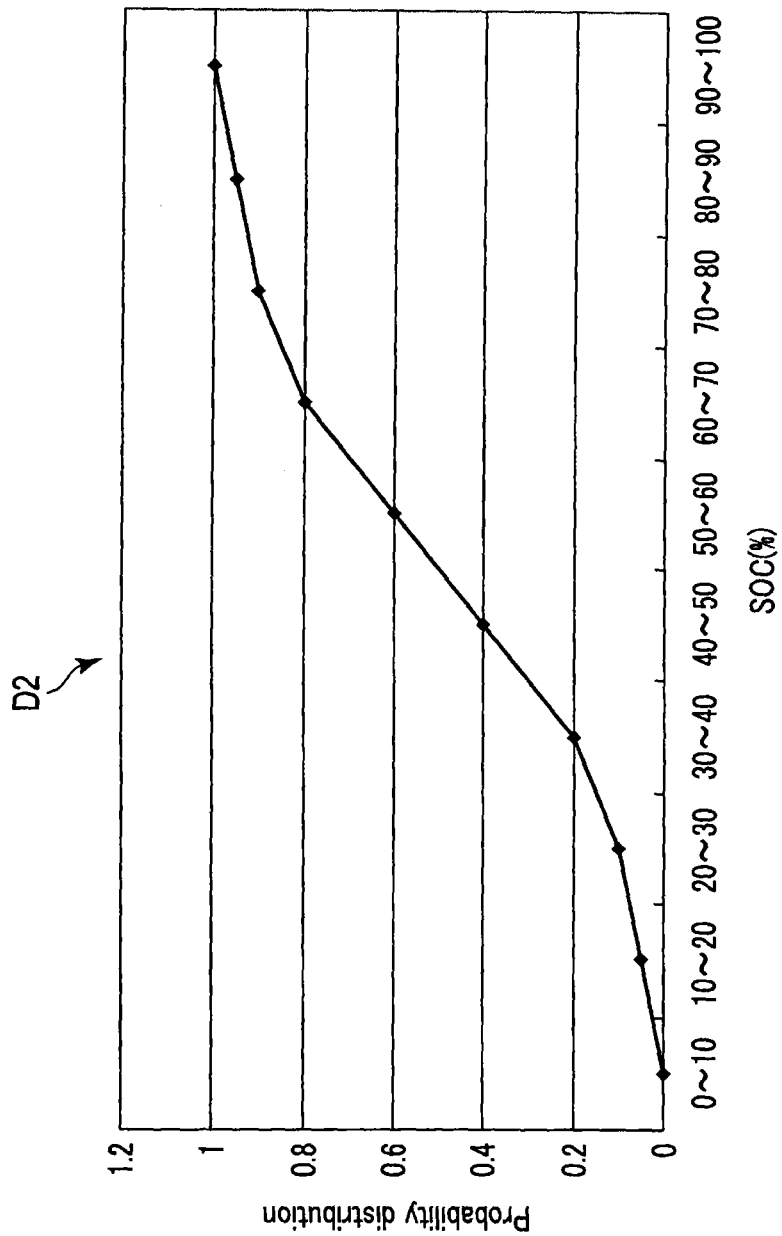
FIG. 3 is a schematic view illustrating an example of SoC distribution data.

SoC is indicative of the ratio of a residual battery capacity to a maximum charge capacity of a battery which is mounted on an electric car. For example, as illustrated in FIG. 3, SoC distribution data D2 is data showing, by a probability distribution, the distribution of SoC of electric cars coming in from each IC.

The traffic demand data D1 and SoC distribution data D2 are data which was estimated based on past data. When simulation is executed by the CS condition estimation unit 12 (to be described later), the traffic demand data input unit 11 can properly change the data, the input of which is accepted, according to days (e.g. weekday, holiday, or special day) on which the congestion condition of each CS is to be estimated. Specifically, when the congestion condition relating to holidays is to be estimated, the traffic demand data input unit 11 may accept the input of only the traffic demand data and SoC distribution data relating to holidays.

Upon accepting an input of the traffic demand data and SoC distribution data, which were transmitted from the traffic demand data input unit 11, and charge recommendation information which is transmitted from the charge recommendation information generation unit 14 (to be described later), the CS condition estimation unit 12 executes simulation by using at least the traffic demand data and SoC distribution data, the input of which was accepted, and estimates the congestion condition of plural CSs provided at respective locations on the toll road. However, if charge recommendation information has been generated by the charge recommendation information generation unit 14 and the CS condition estimation unit 12 has accepted also the input of this charge recommendation information, the CS condition estimation unit 12 executes simulation by using this charge recommendation information in addition to the traffic demand data and SoC distribution data. In addition, if the congestion condition of each CS is estimated, the CS condition estimation unit 12 transmits estimation result information, which is indicative of the result of this estimation, to the condition determination unit 13.

In the meantime, for example, as illustrated in FIG. 4 to FIG. 6, in order to execute simulation, link information, CS information and ITS spot/electronic bulletin board information is preset in the CS condition estimation unit 12. These pieces of information are information for forming a virtual toll road which is applied at the time of executing simulation. Incidentally, in the present embodiment, various pieces of information are set, with a single-path highway being assumed.

For example, as illustrated in FIG. 4, link information D3 is information in which a link name, a downstream link name, a link length, an average electricity efficiency, and an average speed are associated. The link name indicates the name of a block (hereinafter referred to as "link") from one IC to a neighboring IC. The downstream link name indicates the name of a (downstream) link neighboring a link designated by the associated link name. The link length indicates the distance of a link designated by the associated link name. The average electricity efficiency indicates an average distance over which a vehicle running on a link designated by the associated link name can run by consuming electric power of 1 kWh, when simulation is executed by the CS condition estimation unit 12. The average speed indicates an average distance over which a vehicle running on a link designated by the associated link name can run per second, when simulation is executed by the CS condition estimation unit 12.

For example, as illustrated in FIG. 5, CS information D4 is information in which a charge station name, an existing link name, a distance from a starting point, the number of chargers, and a charge speed are associated. The charge station name indicates the name of a CS provided at each location on a toll road. The existing link name indicates the name of a link on which a CS designated by the associated charge station name is provided. The distance from a starting point indicates a distance from a starting point of a link designated by the associated existing link name to a CS designated by the associated charge station name. The number of chargers indicates the number of chargers provided at a CS designated by the associated charge station name. The charge speed indicates a power amount with which a charger can charge a vehicle per second at the CS designated by the associated charge station name.

For example, as illustrated in FIG. 6, ITS spot/electronic bulletin board information D5 is information in which an ITS spot name/electronic bulletin board name, an existing link name, a distance from a starting point, and an associated charge station name are associated. The ITS spot name/electronic bulletin board name indicates the name of an ITS spot or an electronic bulletin board. The existing link name indicates the name of a link on which an ITS spot or electronic bulletin board designated by the associated ITS spot/electronic bulletin board name is provided. The distance from a starting point indicates a distance from a starting point of a link designated by the associated existing link name to an ITS spot or electronic bulletin board designated by the ITS spot/electronic bulletin board name. The associated charge station name indicates the name of a CS, the congestion condition of which can be notified on the ITS spot or electronic bulletin board designated by the associated ITS spot/electronic bulletin board name.

A description is now given of the simulation which is executed by the CS condition estimation unit 12. Incidentally, the simulation is composed of two stages, namely a preprocess stage and an execution stage.

To begin with, the preprocess stage is described.

The CS condition estimation unit 12 generates, based on traffic demand data, virtual vehicles including electric cars and other kinds of vehicles. For example, if it is assumed that the CS condition estimation unit 12 has accepted the input of the traffic demand data D1 illustrated in FIG. 2, the CS condition estimation unit 12 generates, according to the traffic demand data D1 the input of which was accepted, virtual vehicles, such as 160 virtual vehicles entering IC1 and exiting IC2, 160 virtual vehicles entering IC1 and exiting IC3, and 150 virtual vehicles entering IC2 and exiting IC3. Incidentally, it is assumed that the ratio between electric cars and other kinds of vehicles is set according to predetermined setting, and this setting can arbitrarily be made by a user.

At this time, the CS condition estimation unit 12 imparts, to each of the generated virtual vehicles, vehicle attribute information indicative of the attribute of the virtual vehicle. For example, as illustrated in FIG. 7, vehicle attribute information D6 is information in which a vehicle ID, a departure time, an entrance IC name, an exit IC name and an SoC default value are associated. The vehicle ID is identification information for identifying a virtual vehicle, and is randomly set at a time of generating the virtual vehicle. The departure time is indicative of a time at which a virtual vehicle departs from an exit IC, and is uniquely set at a time of generating the virtual vehicle, like the vehicle ID (however, since the departure time is set according to traffic demand data of each unit time, the departure time is randomly set within the range of the unit time). The entrance IC name is indicative of the name of an IC which a virtual vehicle enters, and is set according to the traffic demand data which was used at the time of generating the virtual vehicle. The exit IC name is indicative of the name of an IC which a virtual vehicle exits, and is set, like the entrance IC name, according to the traffic demand data which was used at the time of generating the virtual vehicle. The SoC default value is indicative of an SoC at a time when a virtual vehicle departs from the entrance IC, and is randomly set according to SoC distribution data the input of which was accepted (however, the SoC default values of virtual vehicles of any kind, except electric cars, are all set at "0").

Next, a description is given of the execution stage of the simulation which is executed by the CS condition estimation unit 12. Here, the CS condition estimation unit 12 executes simulation by using a driver model 121, a vehicle model 122, a battery model 123, a CS model 124 and an ITS spot/electronic bulletin board model 125, as illustrated in FIG. 8.

The driver model 121 is a model which is formed by modeling a driver who drives a virtual vehicle. Upon accepting an input of various pieces of information from the vehicle model 122, battery model 123 and ITS spot/electronic bulletin board model 125, the driver model 121 executes a driving path selection process, a CS selection process and a vehicle state selection process, based on the various pieces of information the input of which was accepted.

For example, based on position/speed information transmitted from the vehicle model 122, SoC information transmitted from the battery model 123 and charge recommendation information transmitted from the ITS spot/electronic bulletin board model 125, the driver model 121 executes a selection process of selecting a farthest CS from the present position among the CSs at which the virtual vehicle can arrive. Incidentally, in the present embodiment, although the driver model 121 selects a farthest CS from the present position among the CSs at which the virtual vehicle can arrive, the embodiment is not limited to this example. For example, even when the virtual vehicle can arrive at a CS, if the SoC decreases to less than 20%, there is a concern that the residual battery capacity becomes deficient and driving becomes impossible. Thus, such a method may be adopted that, among the CSs at which the virtual vehicle can arrive within the range of 20% or more of SoC, a farthest CS from the present position is selected.

In addition, based on position information of a vehicle, which is transmitted from the vehicle model 122, the driver model 121 executes a selection process of selecting the state of the vehicle, which is, in this example, one of three states, namely, "driving", "charging" and "waiting for charge". For example, until the vehicle arrives at a selected CS, the driver model 121 selects "driving" as the state of the vehicle. If the vehicle arrives at the selected CS and starts charge, the driver model 121 selects "charging" as the state of the vehicle. If the vehicle has arrived at the selected CS but the chargers are occupied by other virtual vehicles, the driver model 121 selects "waiting for charge" as the state of the vehicle. Incidentally, if the driver model 121 selects one of the three vehicle states, the driver model 121 sends state information indicative of the selected vehicle state to the vehicle model 122.

The vehicle model 122 is a virtual vehicle itself. Upon accepting an input of the state information from the driver model 121, the vehicle model 122 executes an update process of updating the position and speed of the virtual vehicle, according to a vehicle dynamics equation, if the state of the vehicle, which is indicated by the state information the input of which was accepted, is "driving". Incidentally, if the vehicle model 122 updates the position and speed of the virtual vehicle, the vehicle model 122 transmits the position/speed information, which is indicative of the position and speed of the virtual vehicle after the update, to the driver model 121 and battery model 123, and transfers the state information to the battery model 123.

The battery model 123 is a model which is formed by modeling a battery mounted on the virtual vehicle. Upon accepting an input of the position/speed information and state information from the vehicle model 122 and charge speed information from the CS model 124, the battery model 123 executes an update process of updating the residual battery capacity in accordance with the vehicle state indicated by the state information the input of which was accepted. Specifically, when the vehicle state indicated by the state information, the input of which was accepted, is "driving", the battery model 123 calculates a power consumption amount from the position/speed information the input of which was accepted, and subtracts the power consumption amount from the SoC default value in the vehicle attribute information which was imparted to the virtual vehicle, thereby calculating (updating) the residual battery capacity. In addition, when the vehicle state indicated by the state information, the input of which was accepted, is "charging", the battery model 123 calculates (updates) the residual battery capacity in accordance with the charge speed indicated by the charge speed information the input of which was accepted. Incidentally, upon updating the residual battery capacity, the battery model 123 transmits SoC information, which is indicative of the SoC (i.e. residual battery capacity) after the update, to the driver model 121.

The CS model 124 is a model which is formed by modeling the CS provided at each location of a toll road. The CS model 124 transmits charge speed information indicative of the charge speed to the battery model 123 in accordance with the CS information D4 which is preset in the CS condition estimation unit 12.

The ITS spot/electronic bulletin board model 125 is a model which is formed by modeling an ITS spot and an electronic bulletin board that are provided at each location on the toll road. The ITS spot/electronic bulletin board model 125 transmits charge recommendation information to the driver model 121 when the virtual vehicle passes nearby (however, only when there is an input of charge recommendation information from the charge recommendation information generation unit 14). FIG. 9 is a schematic view illustrating a display example of charge recommendation information which is displayed on the ITS spot and electronic bulletin board. FIG. 9 illustrates not a charge wait time at a time when the virtual vehicle has passed by the vicinity of the ITS spot or electronic bulletin board, but a charge wait time at a time when the virtual vehicle has arrived at a destination CS.

When a downstream CS, which is indicated by the charge recommendation information transmitted from the ITS spot/electronic bulletin board model 125, agrees with a CS selected by the selection process of CS, the driver model 121 changes a CS, which is visited at a desired ratio (e.g. a probability of 30%), to a CS with a less charge wait time, that is, executes the selection process of CS once again.

In the above manner, the CS condition estimation unit 12 causes the virtual vehicle, which was generated in the preprocess stage, to run on the virtual toll road, by using the respective models 121 to 125, and simulates the congestion condition of each CS. Then, the CS condition estimation unit 12 transmits estimation result information, which is indicative of an estimation result of the congestion condition of each CS, to the condition determination unit 13.

For example, as illustrated in FIG. 10, estimation result information D7 is information indicative of charge wait times at respective CSs at each unit time. The charge wait time is indicative of a wait time from arrival of the virtual vehicle at a CS to the start of charge. For example, in FIG. 10, it is indicated that a virtual vehicle, which departs from CS1 at 8:00, waits for 500 seconds until the start of charge, when the virtual vehicle arrives at CS3. Here, the time instant of each unit time illustrated in FIG. 10 is a time instant when the virtual vehicle passes by CS1 that is a reference. As regards CS1, a wait time of the virtual vehicle, which has arrived at this time instant, is indicated. Then, as regards each of the other charge stations, a wait time in a case in which the vehicle, which departed from CS1 at this time instant, has run at an average speed and arrived at the charge station, is indicated.

Upon accepting an input of the estimation result information transmitted from the CS condition estimation unit 12, the condition determination unit 13 compares, at each unit time, the congestion conditions of the respective CSs indicated by the estimation result information the input of which was accepted, determines whether a desired condition is satisfied or not, and transmits the result of this determination and determination result information to the charge recommendation information generation unit 14.

As the desired condition, for example, the following conditions are given. If any one of these conditions is satisfied, it is assumed that the desired condition is satisfied.

(1) At all unit times of the estimation result information, when the charge wait times of all neighboring CSs are compared, a value, which is calculated by subtracting a charge wait time of an upstream CS from a charge wait time of a downstream CS, is a threshold value or less.

(2) The number of times of adjustment of charge recommendation information, that is, the number of times of repetition of a series of processes of the output of estimation result information by the CS condition estimation unit 12, the output of determination result information by the condition determination unit 13 and the output of charge recommendation information to the CS condition estimation unit 12 by the charge recommendation information generation unit 14, is a predetermined number or more.

(3) No new charge recommendation information is generated, that is, the content of the determination result, which is indicated by the determination result information the input of which was accepted, is identical to the content of the determination result information, the input of which was already accepted and with respect to which the charge recommendation information relating to the determination result was generated.

For example, as illustrated in FIG. 11, determination result information D8 is information which indicates "OK" if the above condition is satisfied and indicates "NG" if the above condition is not satisfied, as the result of determination by the condition determination unit 13. For example, in FIG. 11, the difference between the charge wait time "100 seconds" at a time when the virtual vehicle, which departed from CS1 at 8:10, has arrived at CS2, and the charge wait time "1800 seconds" at a time when the virtual vehicle, which departed from CS1 at 8:10, has arrived at CS3, is a threshold value or more (it is assumed, however, that the threshold value is set at "1200 seconds" in this case). Thus, the condition determination unit 13 determines that the above condition is not satisfied, and sets "NG" for the related part in the determination result information that is transmitted by the condition determination unit 13.

In the meantime, in this embodiment, it is assumed that the condition determination unit 13 operates according to the above condition, but there is no restriction to this. The conditions can arbitrarily be set by the user. For example, the above condition is a condition which was set on the assumption that a virtual vehicle, which is scheduled to perform charge at a downstream CS, is guided to an upstream CS, because if a virtual vehicle, which is scheduled to perform charge at an upstream CS, is guided to a downstream CS, deficiency in electricity may possibly occur in this virtual vehicle. However, when a virtual vehicle, which is scheduled to perform charge at a crowded CS, is to be guided to an upstream or downstream CS, such a condition may be set that "when charge wait times of neighboring CSs are compared at all unit times, the difference between the charge wait times is a threshold value or less."

Upon accepting an input of the determination result and determination result information D8 which were transmitted from the condition determination unit 13, the charge recommendation information generation unit 14 generates, if the determination result the input of which was accepted fails to meet a desired condition, charge recommendation information relating to a CS which fails to meet the desired condition, and sends this charge recommendation information to the CS condition estimation unit 12.

However, if the charge recommendation information generation unit 14 has already generated charge recommendation information and transmitted this charge recommendation information to the CS condition estimation unit 12, the charge recommendation information generation unit 14 transmits to the CS condition estimation unit 12 a charge recommendation information set in which this generated charge recommendation information is added to at least one piece of previously transmitted charge recommendation information.

In addition, if the determination result the input of which was accepted satisfies the desired condition, the charge recommendation information generation unit 14 transmits to the charge recommendation information output unit 15 one of the pieces of information included in the charge recommendation information set which was transmitted to the CS condition estimation unit 12. Incidentally, which charge recommendation information is to be transmitted to the charge recommendation information output unit 15 is determined according to predetermined setting, and the user can arbitrarily make this setting. Specifically, one example is that "the charge recommendation information, which was last output to the CS condition estimation unit 12, is sent to the charge recommendation information output unit 15."

For example, as illustrated in FIG. 12, charge recommendation information D9 is information which is notified to a vehicle running on a toll road by the ITS spot or electronic bulletin board provided at each location of the toll road. In this information, an ITS spot name/electronic bulletin board name, a presentation start time instant, a presentation end time instant, and charge wait times at an upstream CS and a downstream CS are associated.

The ITS spot name/electronic bulletin board name designates the name of an ITS spot or an electronic bulletin board. The presentation start time instant designates a time instant at which the presentation of the charge recommendation information is started on the ITS spot or electronic bulletin board indicated by the associated ITS spot name/electronic bulletin board name. The presentation end time instant designates a time instant at which the presentation of the charge recommendation information is ended on the ITS spot or electronic bulletin board indicated by the associated ITS spot name/electronic bulletin board name. The charge wait times at an upstream CS and a downstream CS designate charge wait times at the respective CSs, and are values according to the estimation result information used by the condition determination unit 13.

Upon accepting an input of the charge recommendation information that was transmitted from the charge recommendation information generation unit 14, the charge recommendation information output unit 15 outputs the charge recommendation information, the input of which was accepted, to an external terminal (e.g. the ITS spot or electronic bulletin board provided at each location on the toll road).

Next, referring to a flowchart of FIG. 13, a description is given of an example of the operation of the above-described charge management apparatus 1.

To start with, upon accepting an input of the traffic demand data and SoC distribution data which were transmitted from the external terminal, the traffic demand data input unit 11 transmits the traffic demand data and SoC distribution data, the input of which was accepted, to the CS condition estimation unit 12 (step S1).

Subsequently, upon accepting an input of the traffic demand data and SoC distribution data which were transmitted from the traffic demand data input unit 11, the CS condition estimation unit 12 executes simulation by using at least the traffic demand data and SoC distribution data the input of which was accepted, estimates the congestion condition of the respective CSs, and transmits estimation result information, which is indicative of the result of this estimation, to the condition determination unit 13 (step S2).

Next, upon accepting an input of the estimation result information transmitted from the CS condition estimation unit 12, the condition determination unit 13 compares, at each unit time, the congestion conditions of the respective CSs indicated by the estimation result information the input of which was accepted, and determines whether a desired condition is satisfied or not (step S3).

If the determination result by the process of step S3 indicates "No" (No in step S3), the charge recommendation information generation unit 14 generates charge recommendation information relating to a CS which fails to meet the desired condition, and sends this generated charge recommendation information to the CS condition estimation unit 12 (step S4), and then returns to the process of step S2. Specifically, the CS condition estimation unit 12 executes once again the simulation by using not only the traffic demand data and SoC distribution data the input of which was already accepted, but also the charge recommendation information which was sent from the charge recommendation information generation unit 14 (step S2). However, when either the condition (2) or condition (3) is satisfied, the charge recommendation information generation unit 14 advances to a process of step S5 (to be described later).

If the determination result by the process of step S3 indicates that the desired condition is satisfied (Yes in step S3), the charge recommendation information output unit 15 outputs, to the external terminal, one of the pieces of information included in the charge recommendation information set, which the charge recommendation information generation unit 14 transmitted to the CS condition estimation unit 12 (step S5).

In the meantime, in the present embodiment, the congestion condition at each CS is indicated by using the charge wait time, but there is no restriction to this. For example, the congestion condition may be indicated by using the number of vehicles which wait for charge, or the number of vehicles, per charger, which wait for charge.

Additionally, in this embodiment, the charge wait time at each CS is indicated by the charge recommendation information, but there is no restriction to this. For example, the charging fee may be varied in accordance with the charge wait time. A higher charging fee is set for charge at a CS where the charge wait time is longer, and a lower charging fee is set for charge at a CS where the charge, wait time is short. Then, the charging fee at each CS may be indicated by the charge recommendation information.

Additionally, in this embodiment, the charge management apparatus, which provides charge recommendation information to drivers, has been described, with a single-path toll road being set as a target, but there is no restriction to this. For example, a network-like road, along which there are branch parts and confluent parts are present, may be set as a target.

Additionally, in this embodiment, a virtual vehicle is generated in the CS condition estimation unit 12, and simulation is executed in units of this virtual vehicle, but there is no restriction to this. For example, simulation may be executed by using not an individual vehicle unit, but a traffic flow as a fluid model. In this case, charging actions can be expressed probabilistically.

Additionally, in this embodiment, the charge recommendation information is notified to the driver through the ITS spot or electronic bulletin board, but the notification unit for notifying the charge recommendation information to the driver is not limited to this.

The above-described first embodiment is configured to include the CS condition estimation unit 12 which executes simulation by using at least the traffic demand data and SoC distribution data; the condition determination unit 13 which determines whether a desired condition is satisfied or not, by using the estimation result information by the CS condition estimation unit 12; and the charge recommendation information generation unit 14 and charge recommendation information output unit 15, which generate the charge recommendation information by using the determination result information by the condition determination unit 13 and outputs this charge recommendation information. By this configuration, the congestion at each CS of a toll road can be relaxed.

Figure 14:
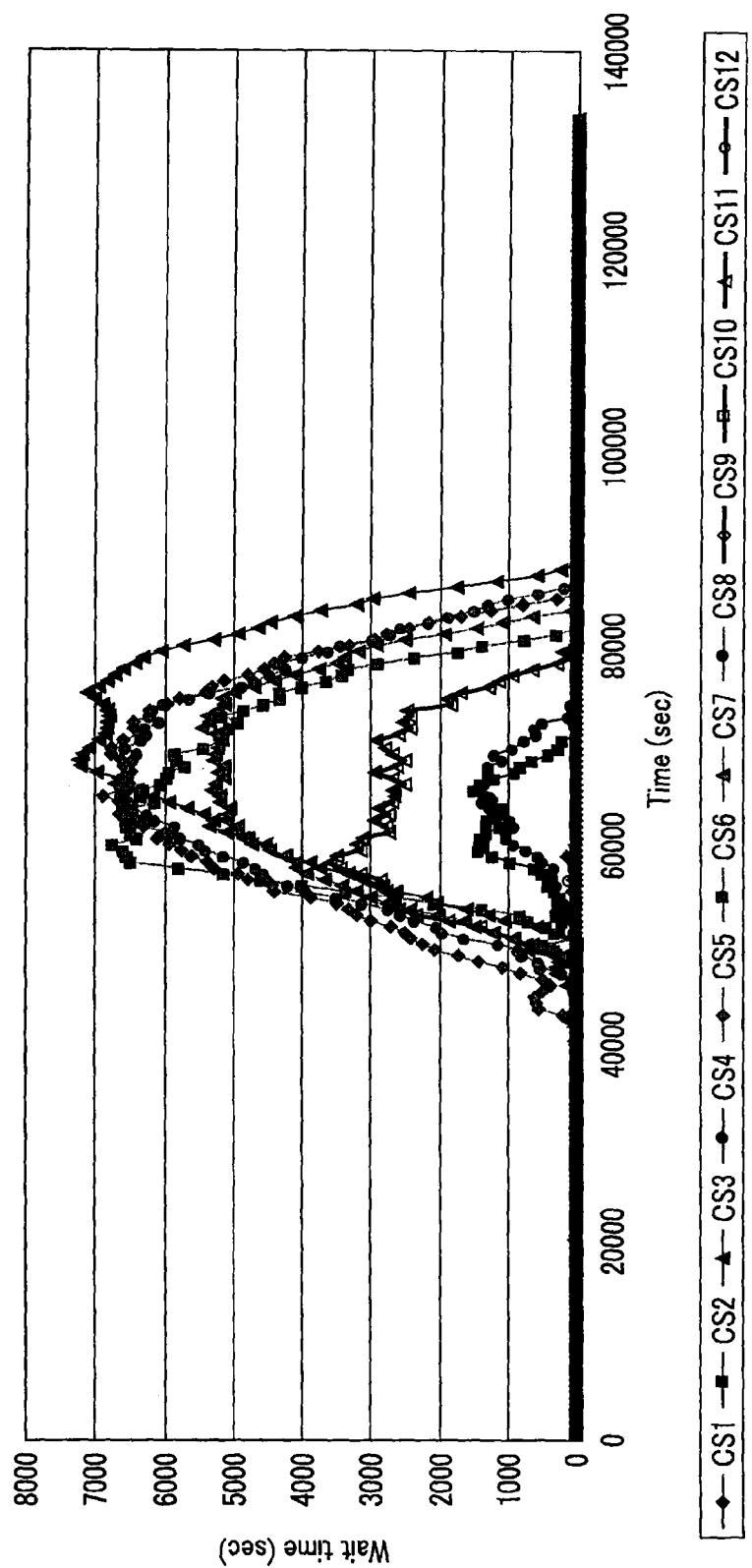
FIG. 14 is a schematic view illustrating an example of a simulation result by the charge management apparatus according to the first embodiment.
Figure 15:
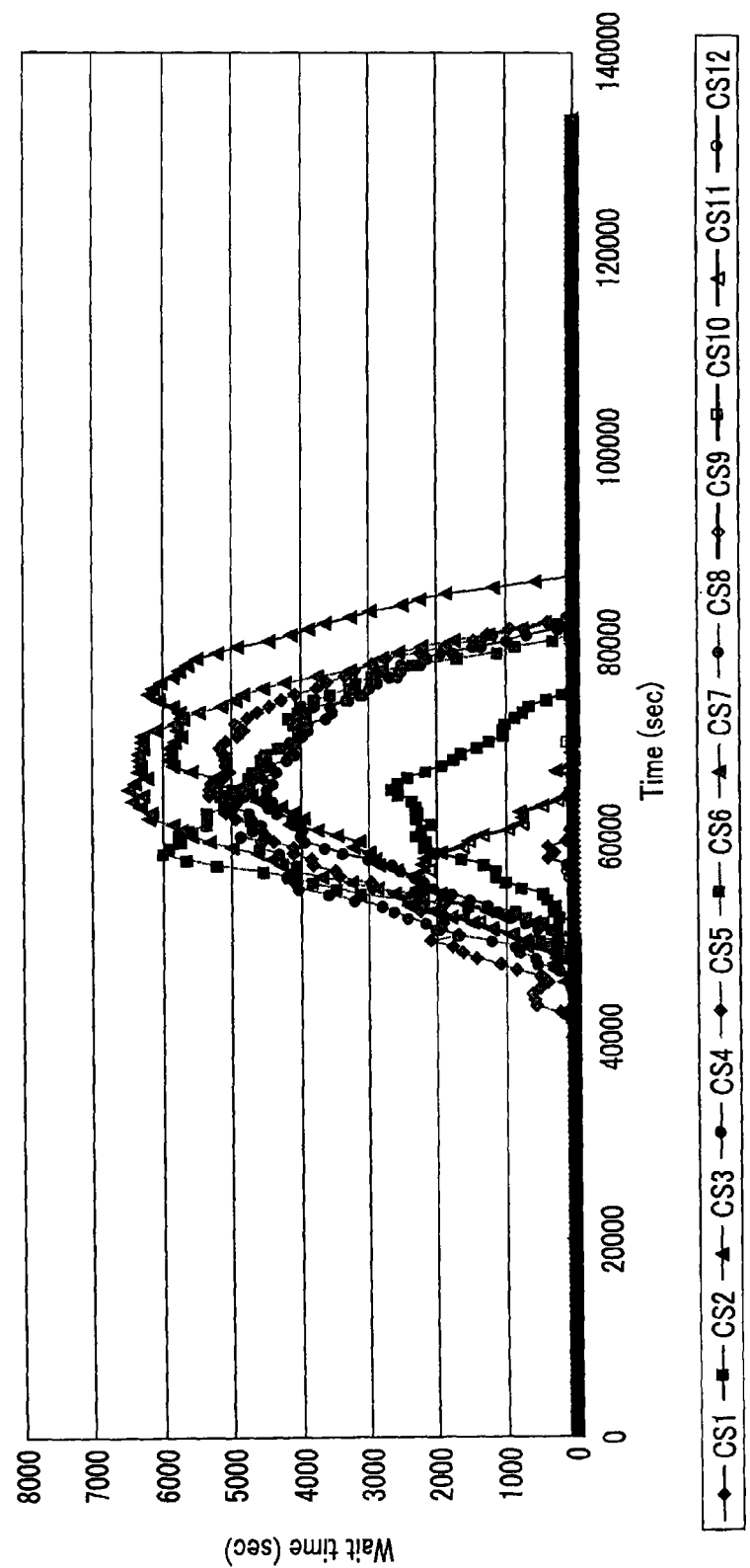
FIG. 15 is a schematic view illustrating another example of the simulation result by the charge management apparatus according to the first embodiment.

For example, FIG. 14 is a schematic view illustrating an example of a transition of charge wait time, at a time when the congestion condition of each CS was estimated in the CS condition estimation unit 12 without using the charge recommendation information. FIG. 15 is a schematic view illustrating an example of a transition of charge wait time, at a time when the congestion condition of each CS was estimated in the CS condition estimation unit 12 by using the charge recommendation information. If the schematic view of FIG. 14 and the schematic view of FIG. 15 are compared, the maximum value of charge wait time in the schematic view of FIG. 14 exceeds 7000 seconds, whereas the maximum value of charge wait time in the schematic view of FIG. 15 does not exceed 7000 seconds. From this, it is understood that the maximum value of charge wait time is reduced and the relaxation of the congestion at each CS of the toll road is realized by repeatedly executing the output of the estimation result information by the CS condition estimation unit 12, the output of the determination result information by the condition determination unit 13, and the output of the charge recommendation information by the charge recommendation information generation unit 14.

Figure 16:
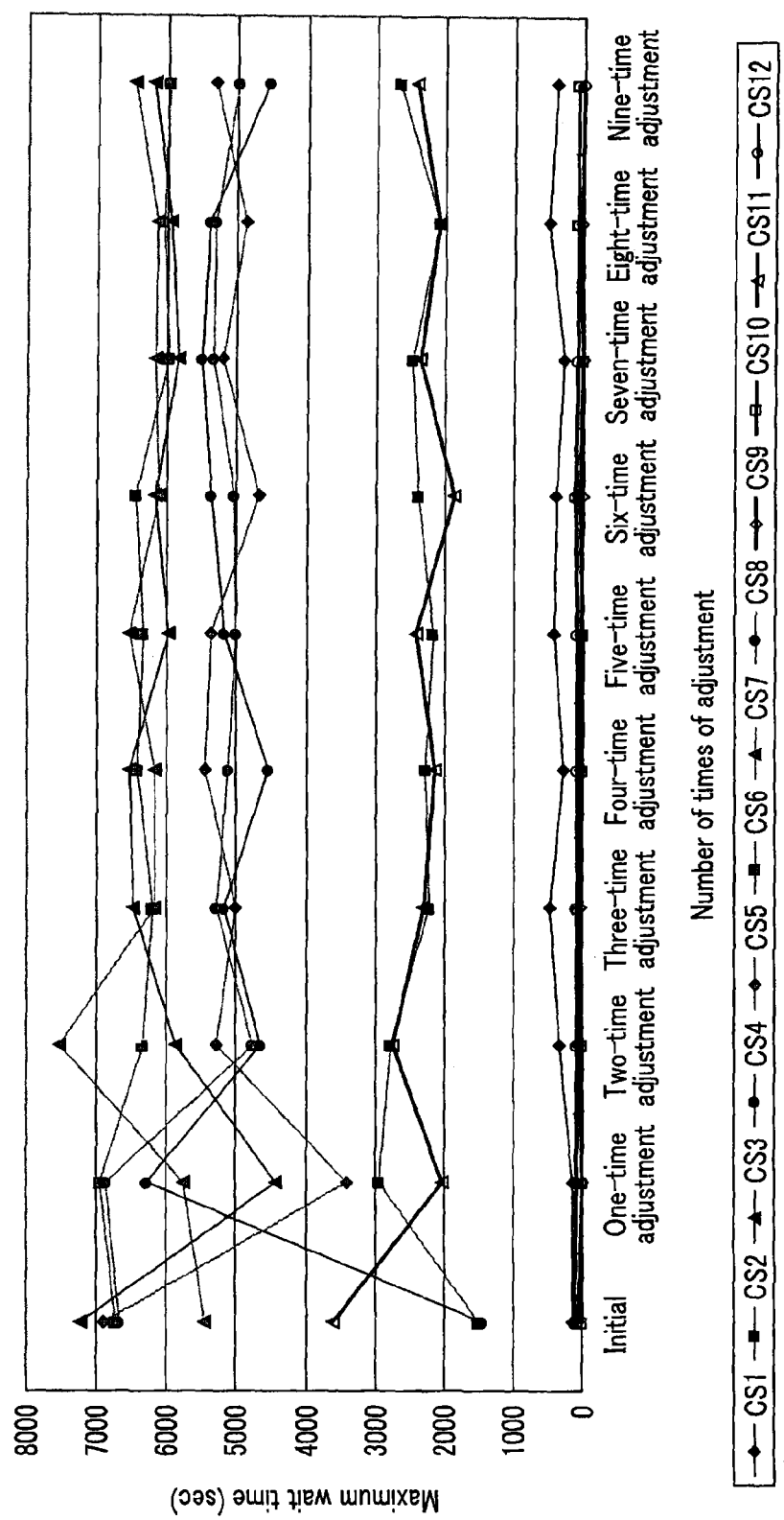
FIG. 16 is a schematic view illustrating still another example of the simulation result by the charge management apparatus according to the first embodiment.

In addition, FIG. 16 is a schematic view illustrating an example of a transition of the maximum value of charge wait time at each CS estimated by the CS condition estimation unit 12. In this case, too, it is understood that the maximum value of charge wait time is reduced by repeatedly executing the output of the estimation result information by the CS condition estimation unit 12, the output of the determination result information by the condition determination unit 13, and the output of the charge recommendation information by the charge recommendation information generation unit 14. It is also understood that the variance in maximum values of charge wait time decreases. Specifically, it is understood that the relaxation of the congestion at each CS of the toll road is realized.

Specifically, also on an actual toll road, the realization of relaxation of congestion at each CS of the toll road can be expected, as illustrated in FIG. 15 and FIG. 16, by presenting the charge recommendation information generated by the charge recommendation information generation unit 14.

Second Embodiment

Figure 17:
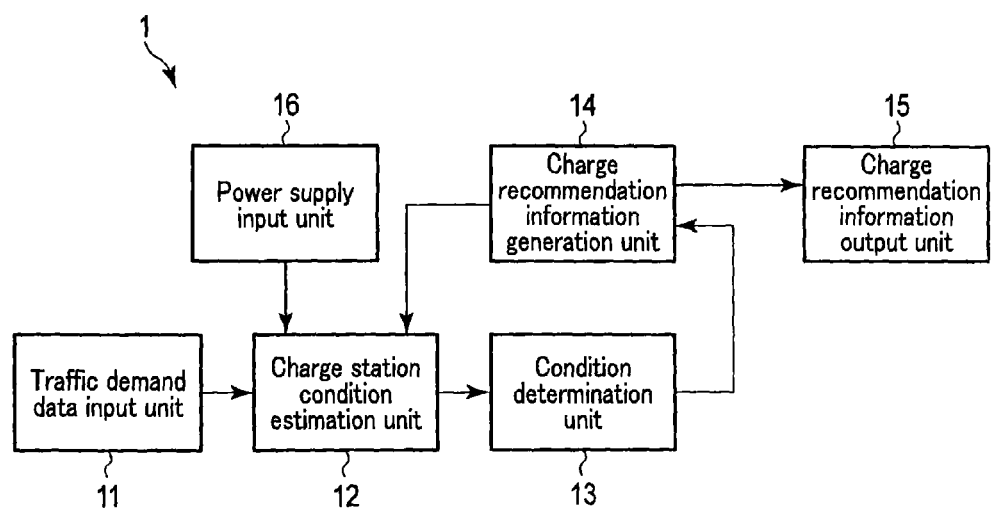
FIG. 17 is a schematic view illustrating a configuration example of a charge management apparatus according to a second embodiment.

FIG. 17 is a schematic view illustrating a configuration example of a charge management apparatus according to a second embodiment. Unlike the charge management apparatus according to the above-described first embodiment, a power supply input unit 16 is added to the charge management apparatus illustrated in FIG. 1.

Incidentally, since the traffic demand data input unit 11, condition determination unit 13, charge recommendation information generation unit 14 and charge recommendation information output unit 15 have the same functions as in the above-described first embodiment, a detailed description thereof is omitted here. Hereinafter, different functions from the first embodiment will mainly be described.

Upon accepting an input of planned power supply amount information which is transmitted from an external terminal and is indicative of a power amount which each CS can supply, the power supply input unit 16 transmits the planned power supply amount information, the input of which was accepted, to the CS condition estimation unit 12.

For example, as illustrated in FIG. 18, planned power supply amount information D10 is information indicative of a power amount, which each CS can supply, for each unit time. For example, it is indicated that CS1 can supply power of 250 kWh during a period from 0:00 to 1:00.

The CS condition estimation unit 12 accepts an input of the planned power supply amount information from the power supply input unit 16, in addition to the traffic demand data and SoC distribution data from the traffic demand data input unit 11 and the charge recommendation information from the charge recommendation information generation unit 14. Then, based on the planned power supply amount information the input of which was accepted, the CS condition estimation unit 12 determines the number of available chargers at each CS for each unit time (generates number-of-available chargers information D11), for example, as indicated by D11 in FIG. 19, and then executes simulation and estimates the congestion condition of each CS, like the above-described first embodiment.

Figure 20:
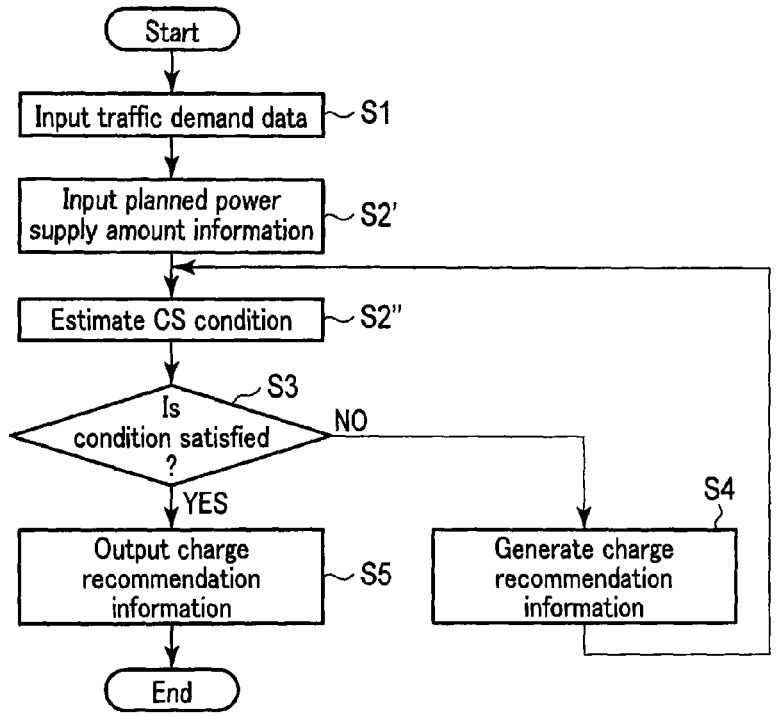
FIG. 20 is a flowchart illustrating an operation example of the charge management apparatus according to this embodiment.

Referring now to a flowchart of FIG. 20, a description is given of an example of the operation of the charge management apparatus 1 according to the present embodiment. Incidentally, since the process of steps S1, and S3 to S5 is the same as in the above-described first embodiment, a detailed description thereof is omitted here.

After the process of step S1, the power supply input unit 16 accepts an input of planned power supply amount information which is transmitted from the external terminal, and then transmits the planned power supply amount information, the input of which was accepted, to the CS condition estimation unit 12 (step S2').

Subsequently, upon accepting an input of the traffic demand data and SoC distribution data transmitted from the traffic demand data input unit 11 and the planned power supply amount information transmitted from the power supply input unit 16, the CS condition estimation unit 12 determines, based on the planned power supply amount information the input of which was accepted, the number of available chargers at each CS for each unit time. Thereafter, while considering the determined number of available chargers at each CS for each unit time, the CS condition estimation unit 12 executes simulation by using at least the traffic demand data and SoC distribution data the input of which was accepted, estimates the congestion condition of each CS, and transmits the estimation result information indicative of the result of the estimation to the condition determination unit 13 (step S2").

According to the above-described second embodiment, by the configuration which further includes the power supply input unit 16 that can input/output the planned power supply amount information, even in the case where the planned power supply amount varies depending on time slots, the number of available chargers can be varied and simulation can be executed, and thus the congestion at each CS of the toll road can be relaxed.

Third Embodiment

Figure 21:
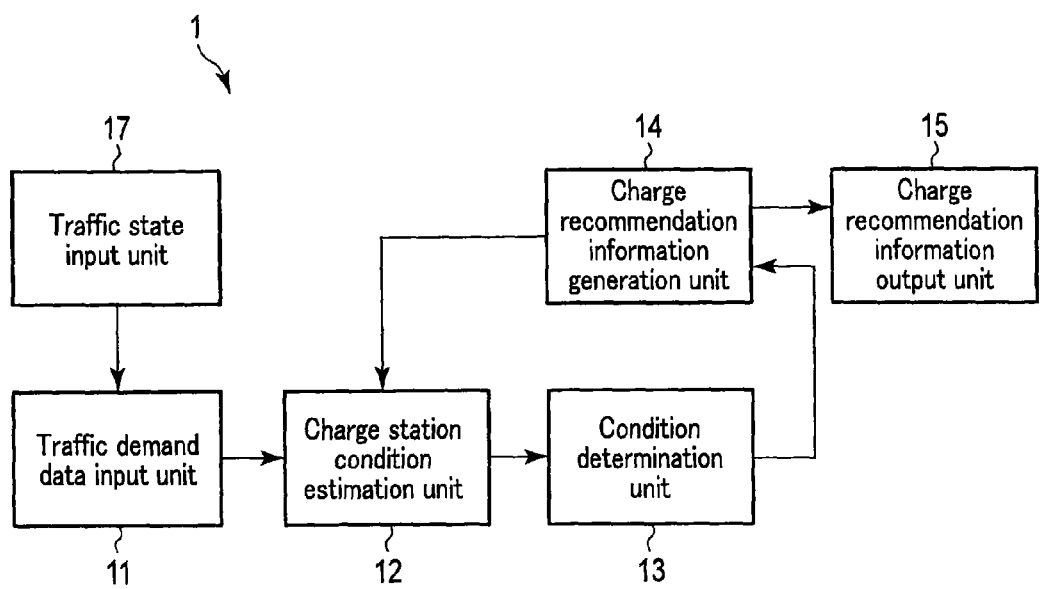
FIG. 21 is a schematic view illustrating a configuration example of a charge management apparatus according to a third embodiment.

FIG. 21 is a schematic view illustrating a configuration example of a charge management apparatus according to a third embodiment. Unlike the charge management apparatuses according to the above-described first and second embodiments, a traffic state input unit 17 is added to the charge management apparatus illustrated in FIG. 1.

Incidentally, since the condition determination unit 13, charge recommendation information generation unit 14 and charge recommendation information output unit 15 have the same functions as in the above-described first and second embodiments, a detailed description thereof is omitted here. Hereinafter, different functions from the first and second embodiments will mainly be described.

Upon accepting an input of actually measured traffic demand data which was transmitted from an external terminal, the traffic state input unit 17 transmits the actually measured traffic demand data, the input of which was accepted, to the traffic demand data input unit 11. Incidentally, the actually measured traffic demand data is traffic demand data which was actually measured by an ETC (Electronic Toll System) provided, for example, at an IC or the like, and the actually measured traffic demand data is data for correcting traffic demand data.

The traffic demand data input unit 11 accepts an input of the actually measured traffic demand data transmitted from the traffic state input unit 17, in addition to the traffic demand data and SoC distribution data transmitted from the external terminal. Then, the traffic demand data input unit 11 corrects the traffic demand data the input of which was accepted, by using the actually measured traffic demand data the input of which was accepted, and then transmits the corrected traffic demand data and the SoC distribution data, the input of which was accepted, to the CS condition estimation module 12.

Upon accepting an input of the corrected traffic demand data and SoC distribution data transmitted from the traffic demand data input unit 11, the CS condition estimation unit 12 executes simulation by using at least the corrected traffic demand data and SoC distribution data the input of which was accepted, like the above-described first embodiment, and estimates the congestion condition of each CS.

Referring now to a flowchart of FIG. 22, a description is given of an example of the operation of the charge management apparatus 1 according to the present embodiment. Incidentally, since the process of steps S3 to S5 is the same as in the above-described first and second embodiments, a detailed description thereof is omitted here.

To start with, upon accepting an input of actually measured traffic demand data transmitted from the external terminal, the traffic state input unit 17 transmits the actually measured traffic demand data, the input of which was accepted, to the traffic demand data input unit 11 (step S1').

Subsequently, upon accepting an input of the traffic demand data and SoC distribution data transmitted from the external terminal and the actually measured traffic demand data transmitted from the traffic state input unit 17, the traffic demand data input unit 11 corrects the traffic demand data the input of which was accepted, by using the actually measured traffic demand data the input of which was accepted, and then transmits the corrected traffic demand data and the SoC distribution data, the input of which was accepted, to the CS condition estimation module 12 (step S1'').

Next, upon accepting an input of the corrected traffic demand data and SoC distribution data transmitted from the traffic demand data input unit 11, CS condition estimation unit 12 executes simulation by using at least the corrected traffic demand data and SoC distribution data the input of which was accepted, estimates the congestion condition of each CS, and transmits the estimation result information indicative of the result of the estimation to the condition determination unit 13 (step S2''').

According to the above-described third embodiment, by the configuration which further includes the traffic state input unit 17 that can input/output the actually measured traffic demand data for correcting the traffic demand data, even in the case where the traffic demand data estimated based past data deviates from the actual traffic demand data, an error can be corrected, and thus the congestion at each CS of the toll road can be relaxed.

According to at least one of the above-described embodiments, there can be provided a charge management apparatus which can notify the charge recommendation information to the driver, even if the current positions and residual battery capacities of all electric cars running on the toll road or the like are not measured.

In the meantime, the method that has been described in connection with each of the above embodiments may be stored as a computer-executable program in a storage medium such as a magnetic disk (e.g. a flexible disk, a hard disk), an optical disk (e.g. a CD-ROM, a DVD), a magneto-optic disc (MO), or a semiconductor memory, and may be distributed.

Additionally, the storage form of this storage medium may be any form as long as the storage medium can store programs and is readable by a computer.

Additionally, an OS (operating system) running on a computer based on an instruction of a program installed from the storage medium into the computer, or MW (middleware), such as database management software or network software, may execute a part of each of processes for realizing the above embodiments.

Additionally, the storage medium in each embodiment is not limited to a medium which is independent from the computer, and includes a storage medium which stores or temporarily stores, by download, a program which is transmitted over a LAN or the Internet.

Additionally, the number of storage media is not limited to one. The configuration of the storage media in the invention includes such a case that the process in each of the above-described embodiments is executed from a plurality of media, and the configuration of the media may be any configuration.

Incidentally, the computer in each embodiment is a computer which executes each process in each embodiment, based on a program stored in the storage medium. The computer may have any configuration, for example, a configuration as a single apparatus such as a personal computer, or a configuration as a system in which a plurality of apparatuses are connected over a network.

Additionally, the computer in each embodiment is not limited to a personal computer, and is a general concept of equipment and apparatuses including an arithmetic processing apparatus included in information processing equipment, a microcomputer, etc., which can realize the functions of the invention by programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A charge management apparatus comprising:
   an input unit configured to receive first traffic demand data indicative of a number of vehicles entering/exiting a plurality of interchanges of a toll road;
   a first estimation unit configured to execute a first simulation to estimate a congestion condition of a plurality of charge stations provided along the toll road by using the first traffic demand data, and estimating charge wait times at the plurality of charge stations;
   a determination unit configured to compare the estimated charge wait times at the respective charge stations, and determining whether at least one predetermined condition is satisfied;
   a generation unit configured to generate charge recommendation information to be output to an external terminal and indicative of a charge station capable of charging, when a result of determination by the determination unit indicates that no predetermined condition is satisfied;
   a second estimation unit configured to execute a second simulation to estimate a congestion condition of the plurality of charge stations by using the generated charge recommendation information in addition to the first traffic demand data, and estimating once again the charge wait times at the respective charge stations; and
   an output unit configured to output the charge recommendation information used in the second simulation to the external terminal when a result of determination by the determination unit indicates that the at least one predetermined condition is satisfied in one of repeatedly executing processes by the determination unit, the generation unit and the second estimation unit,
   wherein the determination unit is configured to compare the charge wait times at the charge stations which neighbor each other, and to determine whether a value, which is calculated by subtracting a charge wait time of an upstream charge station from a charge wait time of a downstream charge station, is a threshold value or less,
   wherein one of the at least one predetermined condition is said value being the threshold value or less.

2. The charge management apparatus of claim 1, further comprising a second input unit configured to receive planned power supply amount information indicative of power amounts which the plurality of charge stations provided midway along the toll road can supply,
   wherein the first estimation unit is configured to execute the first simulation by using the first traffic demand data and the planned power supply amount information, and
   the second estimation unit is configured to execute the second simulation by using the charge recommendation information, in addition to the first traffic demand data and the planned power supply amount information.

3. The charge management apparatus of claim 1, further comprising a second input unit configured to receive measured second traffic demand data for correcting the first traffic demand data,
   wherein the first estimation unit is configured to execute, after correcting the first traffic demand data by using the measured second traffic demand data, the first simulation by using the corrected first traffic demand data, and
   the second estimation unit is configured to execute the second simulation by using the charge recommendation information, in addition to the corrected first traffic demand data.

4. The charge management apparatus of claim 1, wherein the generation unit is configured to generate, if the result of determination by the determination unit indicates that no predetermined condition is satisfied, charge recommendation information indicative of at least either a charge wait time or a charging fee at the charge station capable of charging.

* * * * *